United States Patent [19]

Goodale et al.

[11] Patent Number: 4,694,861
[45] Date of Patent: Sep. 22, 1987

[54] ROTARY PINCH VALVE

[75] Inventors: David L. Goodale, Anaheim; Nick Darden, Fullerton, both of Calif.

[73] Assignee: Beckman Instruments, Inc., Fullerton, Calif.

[21] Appl. No.: 944,363

[22] Filed: Dec. 22, 1986

[51] Int. Cl.$^4$ .......................... F16K 7/06; F16L 55/14
[52] U.S. Cl. .......................... 137/624.19; 137/624.22; 137/637; 137/595; 137/597; 251/7; 251/68; 251/71; 251/129.11; 251/251
[58] Field of Search ............ 137/595, 636, 637, 637.1, 137/624.16, 624.17, 624.18, 624.19, 624.2, 624.22, 597, 863, 870; 251/4, 6, 7, 9, 68, 70, 71, DIG. 11, 251

[56] References Cited

U.S. PATENT DOCUMENTS

| | | | |
|---|---|---|---|
| 3,075,551 | 1/1963 | Smith et al. | 137/609 |
| 3,386,382 | 6/1968 | Schuette et al. | 251/9 |
| 3,494,175 | 2/1970 | Cusick et al. | 73/37 |
| 3,506,032 | 4/1970 | Eveleigh et al. | 137/624.2 |
| 3,650,296 | 3/1972 | Johnson et al. | 251/9 |
| 4,230,151 | 10/1980 | Jonsson | 137/595 |
| 4,417,884 | 11/1983 | Schoendorfer et al. | 251/9 |
| 4,457,339 | 7/1984 | Juan et al. | 137/624.16 |
| 4,637,817 | 1/1987 | Archibald et al. | 251/68 |

OTHER PUBLICATIONS

Brochure from Garan Scientific Inc. (publication date unknown).

Primary Examiner—George L. Walton
Attorney, Agent, or Firm—W. H. May; Gary T. Hampson; Arnold Grant

[57] ABSTRACT

A random access rotary pinch valve for controlling fluid flow through a plurality of fluid conduits. The valve is adapted to receive and retain the fluid conduits and includes, for each of the conduits, a toggle mechanism comprising a piston and a toggle. The piston and toggle can be latched to pinch the associated fluid conduit to a non-conducting state or may be latched with the conduit in a fluid conducting state. An actuator arm is selectively positioned over the toggle mechanisms and is displaced so as to actuate the toggles from one state to another, thus changing the state of fluid conduction through the associated flexible conduit. In the embodiment disclosed herein, the fluid conduits are arranged about the periphery of an annular valve body and the actuator arm is pivoted by means of the stepper motor over the toggle mechanisms.

10 Claims, 4 Drawing Figures

ROTARY PINCH VALVE

FIELD OF THE INVENTION

The present invention relates generally to the field of fluid control devices and, more particularly, to a pinch valve adapted for use in automated systems.

BACKGROUND

Pinch valves are well known for controlling the flow of fluid. Generally, a pinch valve includes a flexible conduit which in a normal or relaxed state provides a fluid flow path. A pinch mechanism operates to pinch or collapse the conduit and thus interrupt the fluid flow therethrough. Pinch mechanisms may be simple manually operated screw-type devices or more complex motor or solenoid operated devices controlled by electric signals.

Multi conduit pinch valves are known in the art for controlling fluid flow through a plurality of conduits in a synchronized fashion. For example, U.S. Pat. No. 4,457,339 to Juan et al. discloses a multi-programmable pinch valve module including a cam disk with four cams formed thereon. A plurality of hollow cylindrical rollers may be movably disposed about the periphery of the cam disk. As the cam disk rotates, the individual radial lobes about the periphery of the cam disk press the hollow cylindrical rollers into engagement with flexible conduits. The sequence in which the various flexible conduits are pinched closed may be adjusted or programmed by moving the hollow cylindrical rollers to various positions around the periphery of the disk.

Another form of multi conduit pinch valve is used in an instrument known as the E4A ™ Electrolyte Analyzer manufactured and sold by Beckman Instruments, Inc., Brea, Calif. The pinch valve used therein includes a D-shaped shaft over which a plurality of individual cams may be placed. Various cams have different lobe combinations and orientations with respect to D-shaped holes in the center of cams. As the shaft and thus the cams rotate, the cams operate spring loaded pinch elements which pinch or release flexible conduits fixed between the pinch elements and a backing bar or plate. By selecting particular cams, the valve can be programmed to provide predetermined combinations of pinched and released flexible conduits. The valve assembly may be reprogrammed by removing the shaft and replacing the cams with cams of differing lobe combinations and/or orientations.

Each of the above valves, however, has drawbacks and limitations which are particularly troublesome in automated applications. For example, only a relatively limited number of flexible conduits can be controlled by the valves. The valve disclosed by Juan et al. shows applicability to four flexible conduits while the pinch valve in the E4A Analyzer controls up to six conduits. Also, the reprogramming of the valves can be difficult and time consuming, requiring substantial manual effort. More importantly, both of the valves limit the number of combinations of open and closed conduits available. For example, if a multi conduit valve accommodates six conduits, a total of sixty-four on-off combinations are possible. However, if the valve has only four states in each cycle, then only four of the possible sixty-four combinations may be utilized.

Another serious drawback is that the various valve on-off combinations are associated with respective disk or shaft angular positions. In order to change from one on-off combination to another such combination, it may be necessary for the disk or shaft to rotate through angular positions corresponding to unwanted combinations. Accordingly, conduits that are to remain open may be briefly closed while the disk or shaft rotates through unwanted combinations and conduits that are to remain closed may likewise be briefly opened, resulting in unwanted fluid interruption or flow that may have serious effects on the performance of the automated system.

Thus, there is a need for a pinch valve that can accommodate a large number of fluid conduits yet that allows easy programming of the on-off conditions for each of the conduits. Furthermore, there is a need for a pinch valve that does not limit the combinations of pinched and unpinched conduits to some number smaller than the number of possible combinations and does not pinch or release unwanted conduits while changing from one combination to another.

SUMMARY OF THE INVENTION

The present invention overcomes the limitations and drawbacks in the valves described above. The valve of the present invention can easily control a large number of conduits, can be readily programmed, and can accommodate all on-off combinations possible for the conduits controlled by the valve.

The pinch valve of the present invention includes a valve body through which passes a plurality of pinchable conduits. Disposed within the valve body are latching toggles adapted for pinching or releasing each of such conduits. An arm, pivoted at one end by rotating means, swings over the latching toggles and is actuated by suitable means such as a solenoid to latch and unlatch each toggle. By rotating the arm to a selected toggle and energizing the actuating means, the state of the toggle and thus the conducting state of the corresponding conduit is changed. Advantageously, the toggles may be randomly accessed by the arm for independent operation.

In the embodiment disclosed herein, the means for pivoting the arm includes a stepper motor controlled by means of a conventional microcomputer. Consequently, the pinch valve of the present invention may be easily programmed and reprogrammed via the controlling microcomputer. Furthermore, since each toggle and thus each fluid conduit is individually accessed and operated, the pinch valve of the present invention can adjust the toggles and fluid conduits to any combination of conducting and nonconducting states, thus limiting the number of states of the valve only by the number of conduits controlled thereby.

IN THE DRAWINGS

DETAILED DESCRIPTION

Figure 1:
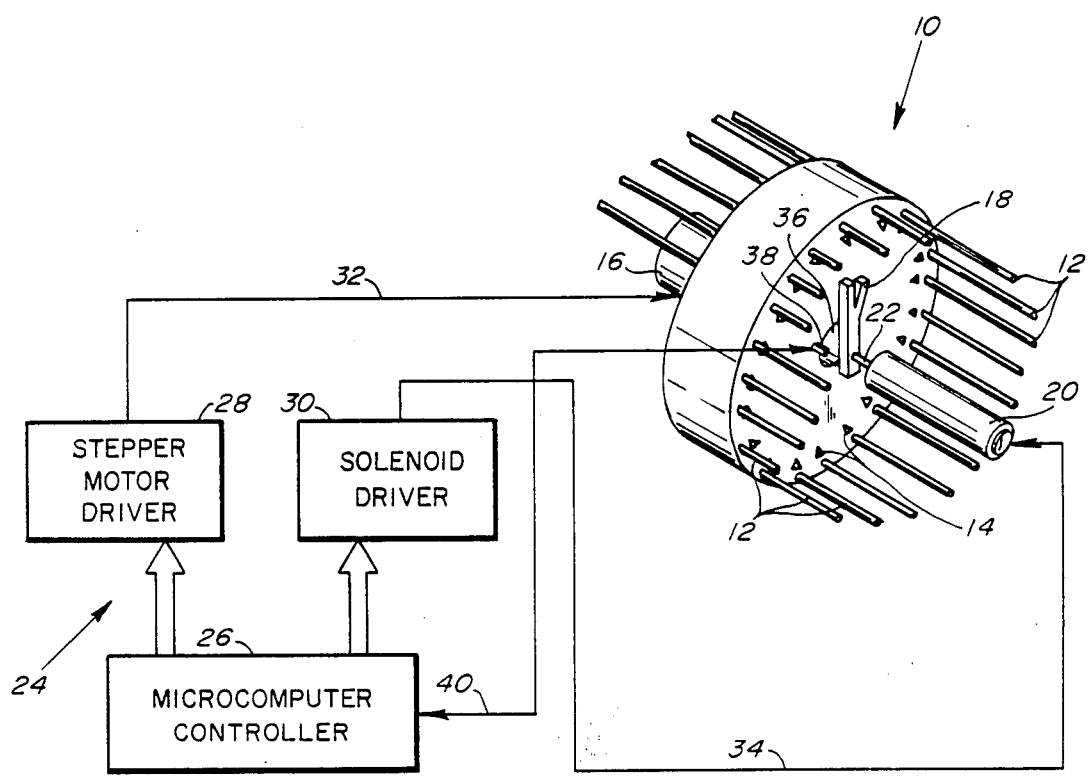
FIG. 1 is a simplified perspective view of the valve in accordance with the present invention as well as a block diagram of a system for controlling the valve.

With reference to FIG. 1, a rotary random-access pinch valve 10 receives and retains a plurality of flexible conduits 12 about the periphery of the valve 10. Associated with each of the conduits 12 is a latching toggle mechanism 14 (described in detail hereinbelow). The valve 10 includes a stepper motor 16 to which is attached to one end of an actuator arm 18. The stepper motor 16 pivots the actuator arm 18 to positions over each of the latching toggle mechanisms 14. A solenoid 20 includes a plunger 22 which rests against the actuator arm 18.

The valve 10 of the present invention is used with a control system 24 comprising a conventional microcomputer controller 26 which may include, for example, a microprocessor and suitable fixed and alterable memory. The microcomputer controller 26 in turn generates signals which are applied to a stepper motor driver 28 and a solenoid driver 30. The stepper motor driver 28, in response to the signals from the microcomputer controller 26, generates phase signals that are applied via a suitable multi conductor cable 32 to the phases of the stepper motor 16 to thereby control the stepper motor 16 and thus the position of the actuator arm 18. Likewise, the solenoid driver 30 produces a drive signal for the solenoid 20 which is applied via a cable 34. The shaft of the stepper motor 16 also carries a slotted disk 36 the periphery of which rotates within an optical detector 38. The optical detector 38 detects the presence of the slot within the disk to provide an index or home position signal that is applied via a line 40 to the microcomputer controller 26.

As is described more fully hereinbelow, the microcomputer controller 26 commands the stepper motor 16 to position the actuator arm 18 above a selected latching toggle mechanism 14. The microcomputer controller 26 then actuates the solenoid 20, causing the plunger 22 to drive the actuator arm 18 against the selected latching toggle mechanism 14, toggling the mechanism 14 and changing the state of the associated flexible conduit 12 from either an open to a closed state or from a closed to open state. Advantageously, by positioning the actuator arm 18 over a selected toggle mechanism 14, the state of a single flexible conductor 12 may be changed without altering the states of the remaining flexible conductors. Thus, the valve 10 of the present invention provides easily controllable, randomly accessible control of the plurality of flexible conduits 12. Furthermore, the number of states of the pinch valve 10 is limited only by the number of on-off states or combinations possible for the plurality of flexible conduits 12.

Figure 2:
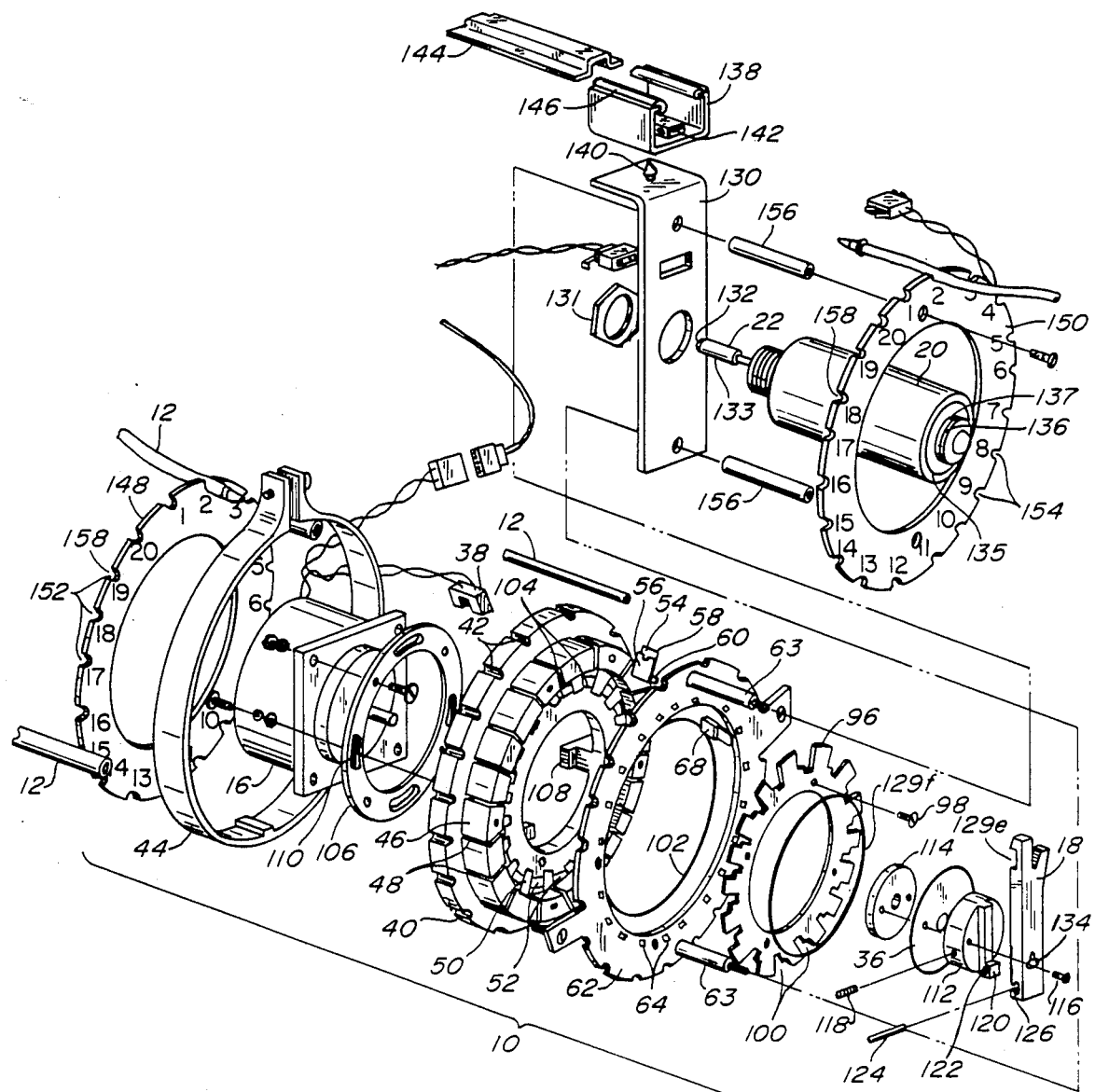
FIG. 2 is a exploded view of the valve of FIG. 1.

Turning now to FIG. 2, the valve 10 includes a valve body 40 having a plurality of grooves or slots 42 formed about the periphery thereof. Each groove 42 is parallel to the central access of the valve body 40 and receives one of the flexible conduits 12. The flexible conduits 12 are held in place by means of a removable clamping ring 44 which may be removably fixed about the periphery of the valve body 40. The flexible conduits 12 are of a suitable resilient silicone rubber tube or a low shore durometer hardness PVC tube.

The valve body 40 also includes a raised annular portion 46 through which are formed a plurality of slots 48 aligned with corresponding ones of the grooves 42. A plurality of cam retainer wells 50 are formed into the valve body 40 in radial alignment with respective ones of the slots 48 and grooves 42. Each of the cam retainer wells 50 includes shaft journals 52 formed on either side thereof.

Figure 3:
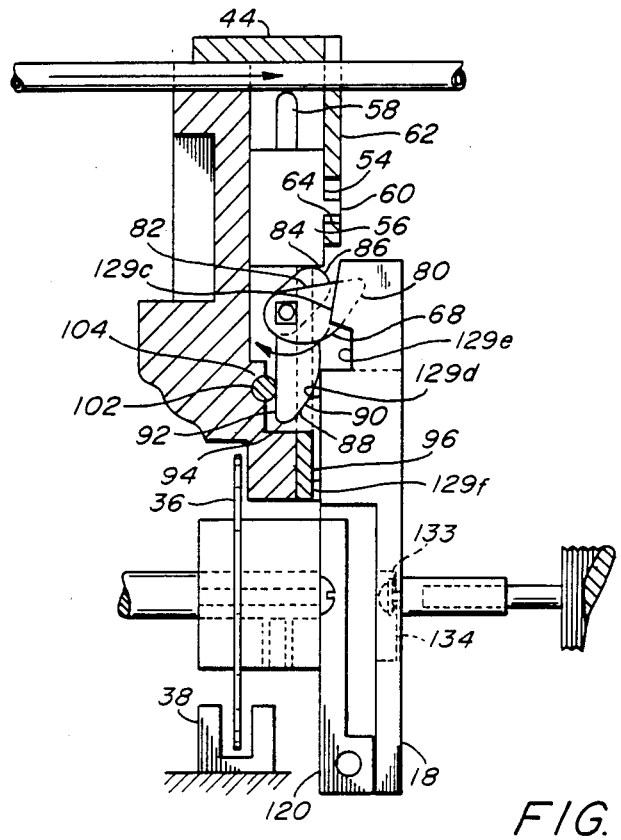
FIG. 3 is a partial section view of the valve of FIG. 1 showing a latching toggle mechanism in both a latched (closed) and unlatched (open) state.
Figure 4:
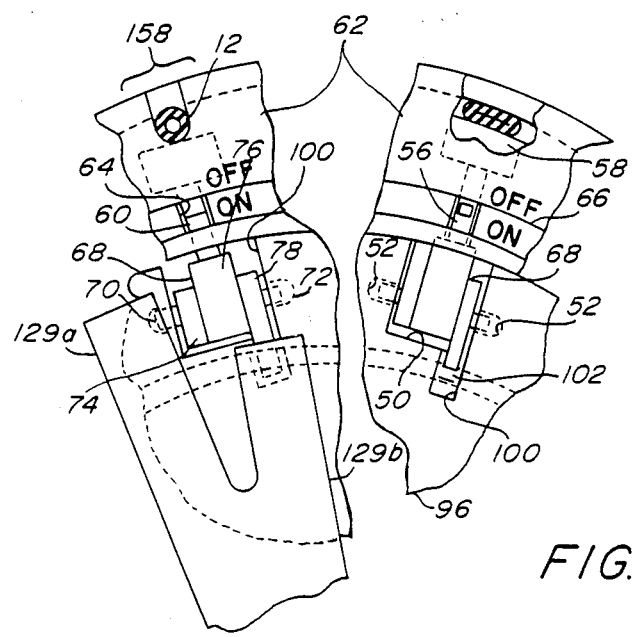
FIG. 4 is partial views of the valve of FIG. 1 showing the relationship between the latching toggles and an actuator arm for use therewith.

As seen with reference to FIGS. 2, 3 and 4, a plurality of pistons 54 are received within the slots 48. Each of the pistons 54 includes a generally flat body 56 slidably retained within the slots 48, a nose portion 58 perpendicular to the body 56, and an indicator protrusion 60 formed into an edge of the body 56. The indicator protrusion 60 extends beyond the annular portion 46 when the piston 54 is installed into the slot 48. The pistons 54 are retained within the slots 48 by means of an annular retainer ring 62 fixed to the body 40 by threaded ends of stand-offs 63. The retainer ring 62 includes slots 64 which receive the indicator protrusions 60, thus limiting the range of travel of the pistons 54 and capturing the pistons 54 within the valve body 40. The retainer ring 62 may include "on" and "off" legends 66 inscribed thereon proximate the ends of the slots 64, the "on" legend nearer the center of the retainer ring 62 than the "off" legend. The legends 66, in combination with the indicator protrusions 60 on the pistons 54, provide a means for indicating the status of each latching toggle mechanism 14.

Disposed within the cam retainer wells 50 are cams 68. Each of the cams 68 includes cylindrical protrusions 70 and 72 which together form a shaft received within the shaft journals 52. The toggles 68 further include three cams 74, 76 and 78. The first cam 74 includes a rounded camming surface 80 and a flat stop surface 82. The second cam 76 is formed to include a lobe 84 having a peak 86 which, with the protrusions 70, 72, define a plane at an angle of approximately 60° degrees with respect to the flat stop surface 82. The third cam 78 includes a lobe 88 which has a rounded camming surface 90 and a flat stop surface 92. The lobe 88 also includes a peak 94 which, together with the protrusions 70, 72, define a plane at a angle of approximately 130° degrees with the plane formed by the protrusions 70, 72 and the peak 86.

The toggles 68 are retained within the respective toggle retaining wells 50 by a toggle retainer plate 96 which is fixed to the valve body 40 by screws 98. The toggle retainer plate 96 includes a plurality of cutouts 100 each of which allows access to the rounded camming surfaces 80 and 90 while retaining the cylindrical protrusions 70, 72 within the shaft journals 52. An O-ring 102, having a radius slightly less than the radius defined by the shaft journals 52, is fixed within a corresponding groove 104 formed into the valve body 40. The O-ring 102 serves to reduce noise associated with the operation of the toggles 68 as is described more fully hereinbelow.

The stepper motor 16 is fixed to an adjusting mounting ring 106 and the mounting ring 106 is in turn fixed to a plurality of tabs 108 protruding from the valve body 40. The tabs 108 are on the opposite side of the valve body 40 from the slots 48. The adjusting mounting ring 106 includes slots 110 which allow adjustment of the angular position of the stepper motor 16 with respect to the valve body 40. The tabs 108 along with the ring 106 mount the stepper motor 16 such that the stepper motor shaft is coaxially aligned with the valve body 40.

The slotted disk 36 is mounted between a pivot 112 and a backplate 114. Screws 116 pass through the pivot 112 and the slotted disk 36 and are threaded into the backplate 114. The pivot 112 is fixed to the stepper motor shaft by means of a set screw 118. The pivot 112 includes a support arm 120 extending radially from the body of the pivot 112. At the outer extension of the support arm 120 is a bore 122. The actuator arm 18 fits over the support arm 112 and is pivotally fixed to the support arm 112 by means of a pin 124 which passes through bores 126 in one end of the actuator arm 18 and the bore 122.

The end of the actuator arm 18 opposite the bores 126 is divided to define diverging projections 129a and 129b. The projection 129a includes a cam contact surface 129c that is adapted to be positioned above the cam 74. Likewise, the projection 129b includes a cam contact surface 129d adapted to be positioned above the cam 78. The projections 129a and 129b diverge sufficiently such that, with the projection 129b aligned over the cam 78, the projection 129a is not in alignment with the cam 74. Likewise, with the projection 129a aligned above the cam 74, the projection 129b is not in alignment with the cam 78. A notch 129e proximate the end of the projection 129a provides clearance between the arm 18 and the cam 78 when the arm 18 is positioned as described below to perform an off-to-on change of state on an adjacent toggle mechanism as is described below. An annular foam rubber ring 129f is fixed to the toggle retainer plate 96 beneath the actuator arm 18 to serve as a shock absorber for the impact of the actuator arm 18 against the toggle retainer plate 96 during operation of the valve 10.

The solenoid 20 is fastened to a solenoid support bracket 130 by means of a nut 131 and the bracket 130 is in turn is supported by the stand-offs 63. The solenoid plunger 22 includes a tip 132 having a circumferential groove 133 near the end thereof. The circumferential groove 133 is received within a T-slot 134 formed into the actuator arm 18. The bracket 130 aligns the solenoid 20 such that the plunger 22, tip 132, circumferential groove 133 and the mating narrow portion of the T-slot 134 are all coaxially aligned with the stepper motor shaft. The actuator arm 118 is urged away from the support arm 120 by means of a conical compression spring 135 retained between the back end of the body of solenoid 20 and a retaining ring 136 and rubber snubbing washer 137 fixed to the solenoid plunger 22.

The entire pinch valve 10 is rotatably fixed to a slide bracket 138 through the combination of a pin 140 formed at the top of the support bracket 130 and a mating snap 142 carried by the slide bracket 138. The slide bracket 138 is in turn adapted to travel along a slide 144 which slidably engages the slide bracket 138. The slide bracket 138 may include nylon grommeting 146 to reduce sliding friction between the slide bracket 138 and the slide 144. The slide 144 may be fixed within an analytical instrument (not shown) and enables the valve 10 to be moved along the slide 144 and then rotated about the pin 140 to provide easy access for maintenance.

The valve 10 may also include two rings 148 and 150, each including peripheral notches 152, 154 to receive the flexible conduits 12. The ring 148 is mounted to the valve body 40 on the same side as the stepper motor 16 and the ring 150 is mounted proximate the solenoid 20. The ring 148 may be mounted directly to the valve body 40 by means of suitable fasteners such as screws and the ring 150 is fixed to the support bracket 130 by stand-offs 156. The rings 148, 150 each carry numerals to identify the associated flexible conduit 12.

In operation, the microcomputer controller 26 commands the stepper motor driver 28 to rotate the stepper motor shaft until the slotted disk 36 is detected by the optical detector 38. The detector 38 provides a feedback signal to the microcomputer controller 26 which 101D-193 in turn establishes an initial or home angular orientiation for the stepper motor shaft and thus the actuator arm 18 affixed thereto. In the embodiment disclosed herein, the stepper motor 16 requires 200 full steps per revolution and the valve 10 accommodates twenty flexible conduits 12 each equally spaced about the periphery of the valve body 40. Accordingly, each flexible conduit 12 is spaced 18° or ten full steps of the stepper motor 16.

To change the state of a fluid conduit 12, the particular fluid conduit is identified to the microcomputer controller by means of, for example, a preprogrammed instruction set stored within the controller 26 or by means of a suitable peripheral device such as a keyboard (not shown). With the flexible conduit 12 identified, the microcomputer controller 26 calculates the number of steps required of the stepper motor 16 and the direction thereof to minimize the travel of the actuator arm 18. The calculation includes two elements: (1) the basic rotational displacement of the actuator arm 18 from its present position to an angular position wherein the center line of the projection 129a on the actuator arm 18 is aligned with the center of the cam 74 on the toggle 68 associated with the flexible conduit 12; and (b), if required, an offset number of steps necessary to position the projection 129b over the cam 78.

A specific example may be illustrated with reference to the Figures, assuming the left-hand portion of FIG. 4 corresponds to the eighteenth position 158 about the periphery of the valve 10 and the conduit 12 at such position 158 is initially in an open state. Accordingly, the toggle 68 is in an orientation as shown in FIG. 3, that is, with the flat stop surface 92 of the cam 78 resting against the O-ring 102. The resiliency of the associated flexible conduit 12 pushes the piston 54 into a retracted position with the piston resting against the cam 76 and the associated fluid conduit 12 open to fluid flow. With the flexible conduit 12 in a conducting or "on" state, the indicator protrusion 60 on the piston 54 is proximate the "on" legend 66 formed on the retainer ring 62. Stored within the memory of the microcomputer system 26 is an indication that the toggle mechanism 14 for the flexible conduit 12 occupying the eighteenth position 158 is in an on or unlatched state. Also stored within the microcomputer system 26 is an indication of the present position of the actuator arm 18. For the purposes of this example, it is assumed that the arm 18 is at the home position wherein the projection 129a is twenty steps counterclockwise from a position centered above the cam 74 at the eighteenth position 150.

With the initial conditions as just described, the microcomputer controller 26 is commanded to change the state of the toggle mechanism 14 at the position 158. The microcomputer controller 26 calculates the number of stepper motor 16 steps required to move the actuator arm 158 from its present position to a position with the projection 129a centered over the cam 74, that is, a twenty step rotation of the actuator arm 18 in a clockwise direction. Based upon the existing condition of the toggle mechanism at the eighteeneth position 158, the microcomputer controller 26 determines that the toggle mechanism is to be changed from an on state to an off state. Because an on-to-off change of state is accomplished with the projection 129a over the cam 74, the microcomputer controller 26 determines that no further offset is required. Accordingly, the microcomputer controller 26 controls the stepper motor driver 28 which in turn controls the stepper motor 16 to accomplish the required twenty step clockwise rotation.

With the actuator arm 18 in place, the microcomputer controller 26, via the solenoid driver 30, actuates the solenoid 20, displacing the solenoid plunger 22 and thus the actuator arm 18 toward the valve body 40, causing contact between the cam contact surface 129c and the rounded camming surface 80. The toggle 68 rotates in a counter-clockwise direction as viewed in FIG. 3, urging the cam 76 against the piston 54. The piston 54 is displaced toward and against the flexible conduit 12, pinching the flexible conduit 12 between the nose portion 58 and the clamping ring 44. The toggle 68 is rotated such that the cam 76 is rotated slightly over center, that is, slightly beyond a position parallel to the valve body 40. The resiliency of the flexible conduit 12 urges the piston 54 against the over-center cam 76, latching the piston 54 and toggle 68 with the flexible conduit 12 in a nonconducting or off state. With the piston 54 moved toward the periphery of the body 40, the indicator protrusion 60 is also moved proximate the "off" legend 66 to indicate for visual inspection that the flexible conduit 12 is in an off or nonconducting fluid state.

The microcomputer controller 26 releases the solenoid 20 and the actuator arm 18 returns to its raised position under the influence of the spring 135. The actuator arm 18 is then free be moved by stepper motor 16 in response to control signals from the microcomputer controller 26.

Assuming now that the microcomputer controller 26 is commanded to open the fluid conduit 12 at the eighteenth position 158, the microcomputer controller 26 determines the present position of the actuator arm 18. The position may be known, for example, by successive calculations of stepper motor 16 displacements with occasional checks of actual stepper motor 16 position by rotating the stepper motor 16 to the home position as indicated by the slotted disk 36 and the detector 38. If, for example, projection 129a of the actuator arm 18 is in a position eighty steps clockwise with respect to the center of cam 74 at the eighteenth position 158, the microcomputer controller 26 first calculates a counter-clockwise rotation of the actuator arm 18 of eighty steps. Because an off-to-on change of state is accomplished with the projection 129b centered over the cam 78, the microcomputer controller 26 also calculates an additional five step counterclockwise displacement to so position the projection 129b.

With the actuator arm 18 in place, the microcomputer controller 26 again cycles the solenoid 20, driving the actuator arm 18 toward the valve body 40 and the cam contact surface 129d into contact with the rounded camming surface 90. The toggle 68 is rotated in a clockwise direction as seen with respect to FIG. 3. The resiliency of the flexible conduit 12 urges the piston 54 toward the center of the valve body 40 as the cam 68 rotates, opening the flexible conduit 12 to fluid flow and placing the flexible conduit 12 into an "on" or conducting state.

Similar actions are carried out for each of the twenty flexible conduits 12. Furthermore, a plurality of flexible conduits 12 can be sequentially controlled by the microcomputer controller 26 by sorting all requested state changes according to position about the periphery of the valve 10 and executing the state changes in sequence. Similar control adaptations will be readily apparent to those skilled in the art.

Accordingly, the valve 10 of the present invention can control any one latching toggle mechanism 14 completely independently of all other latching toggle mechanisms 14 on the valve 10, producing a random-access rotary pinch valve 10 of maximum versatility and adaptability. Furthermore, the state of any toggle 14 is completely independent of the state of all other toggles 14. Accordingly, the valve 10 of the present invention can easily control all possible combinations of states of the latching toggle mechanisms 14, a unique and important advantage in automated applications.

Having described one embodiment of the valve of the present invention, it is to be recognized that the full scope of the present invention is to be limited not by the specific embodiment disclosed herein but by the full scope of the appended claims.

What is claimed is:

1. A random-access pinch valve adapted to selectively pinch and release a plurality of fluid conduits, comprising:
 a valve body adapted to retain the fluid conduits;
 an actuator arm;
 a plurality of toggle mechanisms associated with respective flexible conduits retained by the valve body, each toggle mechanism including latching means responsive to actuation by the actuator arm for positioning the toggle mechanisms in latched or unlatched states, and means for pinching the flexible conduit associated with the toggle mechanism when the toggle mechanism is in one of the latched or unlatched states and for releasing the flexible conduit associated with the toggle mechanism when the mechanism is in the other of the latched or unlatched states;
 means for positioning the actuator arm with respect to the toggle mechanism; and
 means for actuating the arm to change the state of the toggle mechanism actuated by the arm.

2. A valve as in claim 1 wherein the latching means includes a toggle having a first cam and a piston carried by the valve body and riding against the first cam.

3. A valve as in claim 2 wherein the toggle further includes second and third cams fixed with respect to the first cam and adapted to be actuated by the actuator arm.

4. A valve as in claim 3 wherein the valve body includes an outer periphery and the toggle mechanisms and fluid conduits are disposed proximate the outer periphery.

5. A valve as in claim 4 wherein the means for positioning the actuator arm includes means for rotating the actuator arm about a pivot point at the center of the valve body.

6. A valve as in claim 5 wherein the actuator arm includes an end adapted to rotate above the toggle mechanisms and such end includes diverging projections spaced apart a distance greater than the distance between the second and third cams.

7. A valve as in claim 6 wherein the means for rotating the actuator arm further includes means for positioning one of such projections above the second cam or the other of such projections above the third cam.

8. A pinch valve for use with a flexible fluid conduit, comprising:
 a valve body including retaining means for receiving and holding the flexible conduit, backing means for supporting the conduit when the conduit is pinched, and a guide channel generally perpendicular to the conduit;

a piston slidably retained within the guide channel;

a toggle retained within the valve body having first, second and third cams, the first cam including a lobe adapted to be displaced into an over-center position against the piston so as to latch the toggle in the over-center position;

means for displacing the second cam to displace the piston into a position wherein the conduit is pinched; and means for displacing the third cam to release the piston into a second position wherein the conduit is not pinched.

9. A pinch valve as in claim 8 wherein the means for displacing the second and third cams comprises an actuator arm pivoted above the valve body and means for moving the actuator arm into contact with the second or third cams.

10. A pinch valve for use with a flexible fluid conduit, comprising:

a valve body including retaining means for receiving and holding the flexible conduit, backing means for supporting the conduit when the conduit is pinched, and a guide channel generally perpendicular to the conduit;

a piston slidably retained within the guide channel;

a toggle rotatably retained within the valve body having first, second and third cams, the first cam including a lobe adapted to be displaced into an over-center position against the piston so as to latch the toggle in the over-center position and pinch the conduit between the backing means and the piston;

an actuator arm including diverging projections at one end of the arm spaced apart a distance greater than the distance between the second and third cams;

means for pivoting the actuator arm about a second end of the arm and for positioning the diverging projections over the second and third cams; and means for pressing the actuator arm into contact with the second or third cams for latching or unlatching the toggle and thereby pinching or releasing the conduit.

* * * * *